(12) United States Patent
Park

(10) Patent No.: US 11,544,693 B2
(45) Date of Patent: Jan. 3, 2023

(54) COMPLEX PAYMENT SYSTEM USING A PORTABLE TERMINAL, AND COMPLEX PAYMENT METHOD

(75) Inventor: Kyung Yang Park, Seoul (KR)

(73) Assignee: HAREX INFOTECH, INC., Seoul (KR)

( * ) Notice: Subject to any disclaimer, the term of this patent is extended or adjusted under 35 U.S.C. 154(b) by 746 days.

(21) Appl. No.: 14/233,873

(22) PCT Filed: Jul. 11, 2012

(86) PCT No.: PCT/KR2012/005516
§ 371 (c)(1),
(2), (4) Date: May 5, 2014

(87) PCT Pub. No.: WO2013/012200
PCT Pub. Date: Jan. 24, 2013

(65) Prior Publication Data
US 2014/0297381 A1    Oct. 2, 2014

(30) Foreign Application Priority Data
Jul. 20, 2011 (KR) .................. 10-2011-0071837

(51) Int. Cl.
*G06Q 20/32* (2012.01)
*G06Q 20/38* (2012.01)
(Continued)

(52) U.S. Cl.
CPC .......... *G06Q 20/322* (2013.01); *G06Q 20/12* (2013.01); *G06Q 20/20* (2013.01);
(Continued)

(58) Field of Classification Search
CPC .... G06Q 20/322; G06Q 20/12; G06Q 20/367; G06Q 20/3572; G06Q 20/20;
(Continued)

(56) References Cited

U.S. PATENT DOCUMENTS

2001/0051915 A1* 12/2001 Ueno ..................... G06Q 20/04
705/39
2008/0222048 A1  9/2008 Higgins et al.
(Continued)

FOREIGN PATENT DOCUMENTS

| JP | 2002-024730 | 1/2002 |
|----|-------------|--------|
| KR | 1020010044524 | 6/2001 |

(Continued)

OTHER PUBLICATIONS

Extended European Search Report in corresponding application No. 12815222.0 dated Jul. 6, 2015.
(Continued)

*Primary Examiner* — Victoria E. Frunzi
(74) *Attorney, Agent, or Firm* — Hauptman Ham, LLP

(57) ABSTRACT

Disclosed are a complex payment system using a portable terminal, and a complex payment method. According to the present invention, a portable terminal such as a smartphone or a vendor server may analyze and display an optimum payment condition containing a minimum payment amount using bonus information such as card information, discount information, membership point information, or coupon information when a user pays, thus preventing personal information leakage and enabling the user to pay a minimum amount by means of his/her credit card using the bonus information.

28 Claims, 8 Drawing Sheets

(51) Int. Cl.
    *G06Q 20/12*       (2012.01)
    *G06Q 20/36*       (2012.01)
    *G06Q 20/40*       (2012.01)
    *G06Q 20/34*       (2012.01)
    *G06Q 20/20*       (2012.01)

(52) U.S. Cl.
    CPC ..... *G06Q 20/3276* (2013.01); *G06Q 20/3278* (2013.01); *G06Q 20/3572* (2013.01); *G06Q 20/367* (2013.01); *G06Q 20/385* (2013.01); *G06Q 20/387* (2013.01); *G06Q 20/405* (2013.01)

(58) Field of Classification Search
    CPC ............. G06Q 20/3278; G06Q 20/385; G06Q 20/405; G06Q 20/3276; G06Q 20/387
    See application file for complete search history.

(56) References Cited

U.S. PATENT DOCUMENTS

| | | | | |
|---|---|---|---|---|
| 2009/0112766 | A1* | 4/2009 | Hammad | ............... G06Q 20/10 705/44 |
| 2009/0200371 | A1 | 8/2009 | Kean et al. | |
| 2009/0254485 | A1 | 10/2009 | Baentsch et al. | |
| 2010/0082445 | A1 | 4/2010 | Hodge et al. | |
| 2012/0209749 | A1* | 8/2012 | Hammad | ............... G06Q 30/06 705/27.1 |
| 2012/0330743 | A1* | 12/2012 | Schul | ................... G06Q 20/322 705/14.38 |

FOREIGN PATENT DOCUMENTS

| | | |
|---|---|---|
| KR | 1020010053951 | 7/2001 |
| KR | 1020050102025 | 10/2005 |
| KR | 1020060069775 | 6/2006 |
| KR | 1020090063037 | 6/2009 |

OTHER PUBLICATIONS

Invitation to declare maintenance of the application and to correct deficiencies in the Written Opinion/amend application in corresponding application No. 12815222.0 dated Jul. 23, 2015.

* cited by examiner

[FIG 1]
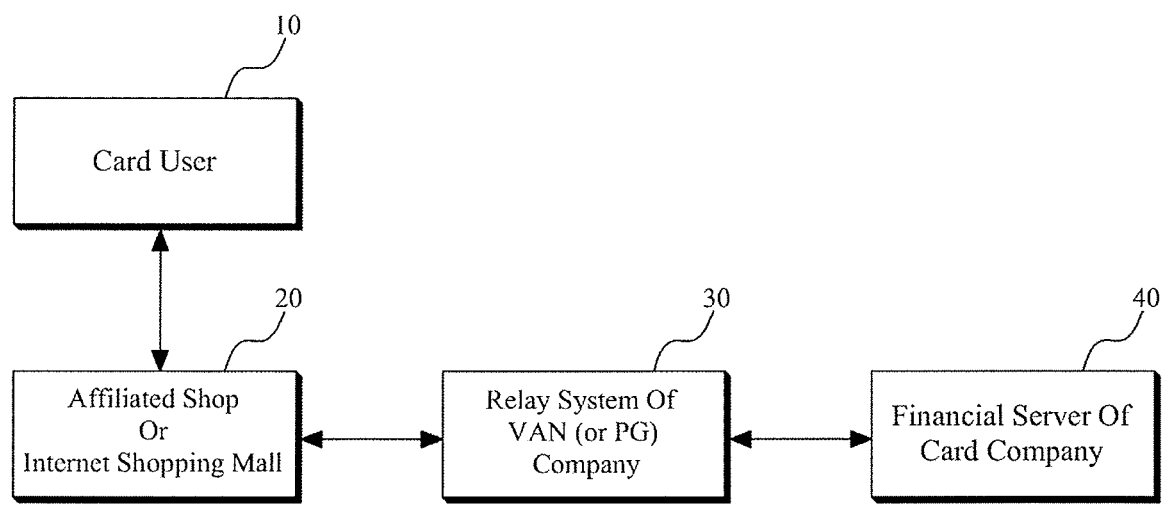
[FIG 2]
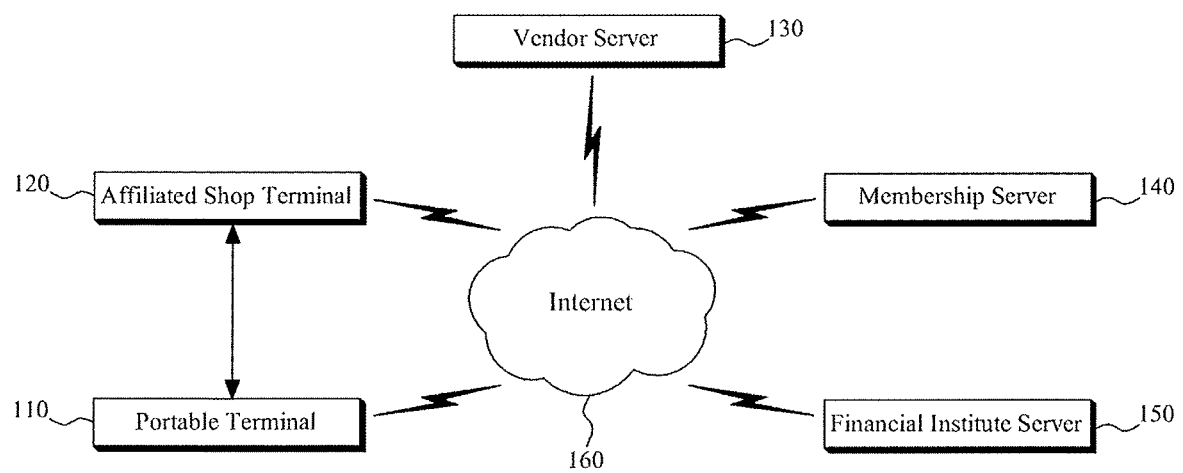

[FIG 3]
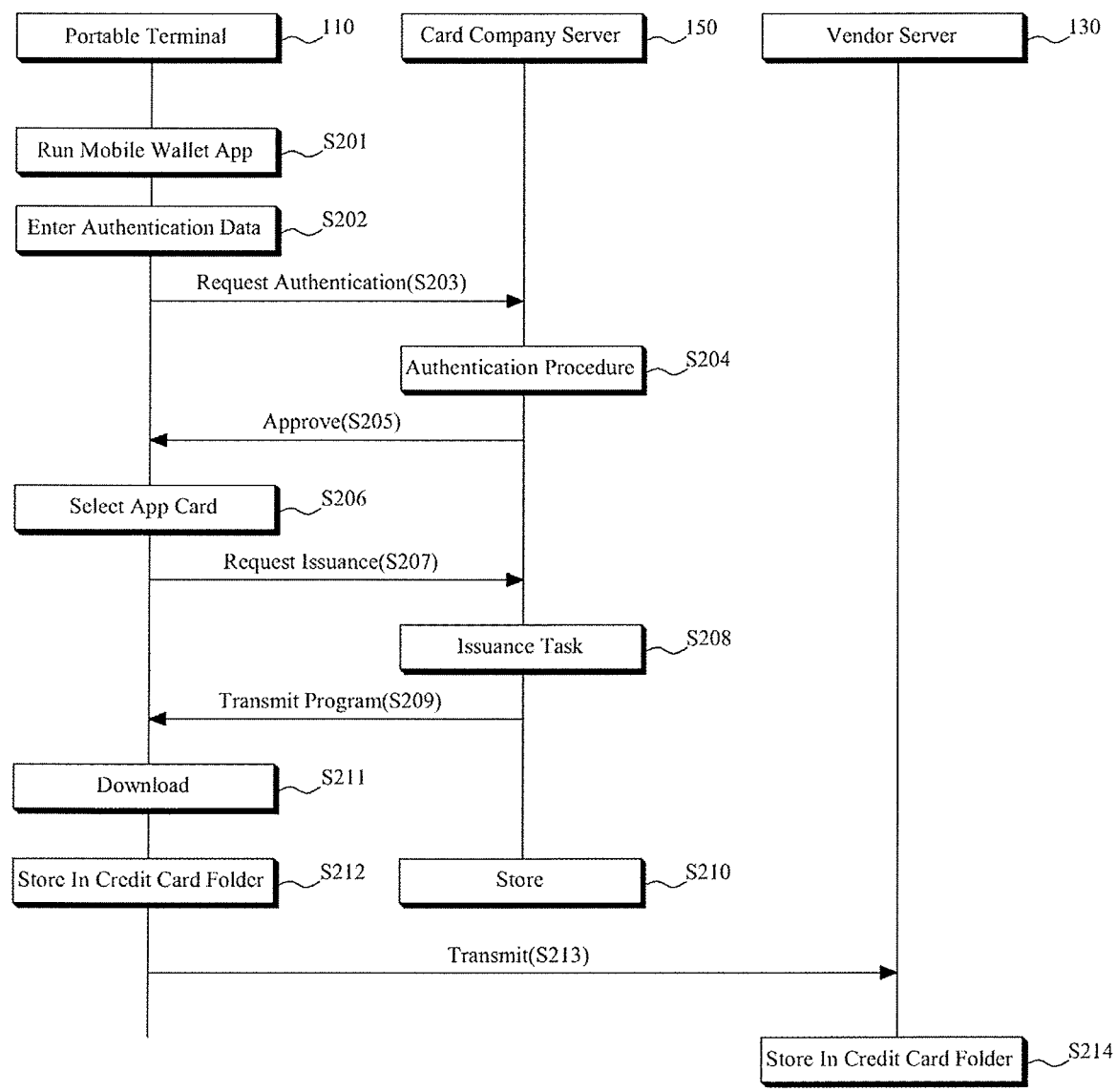

[FIG 4]
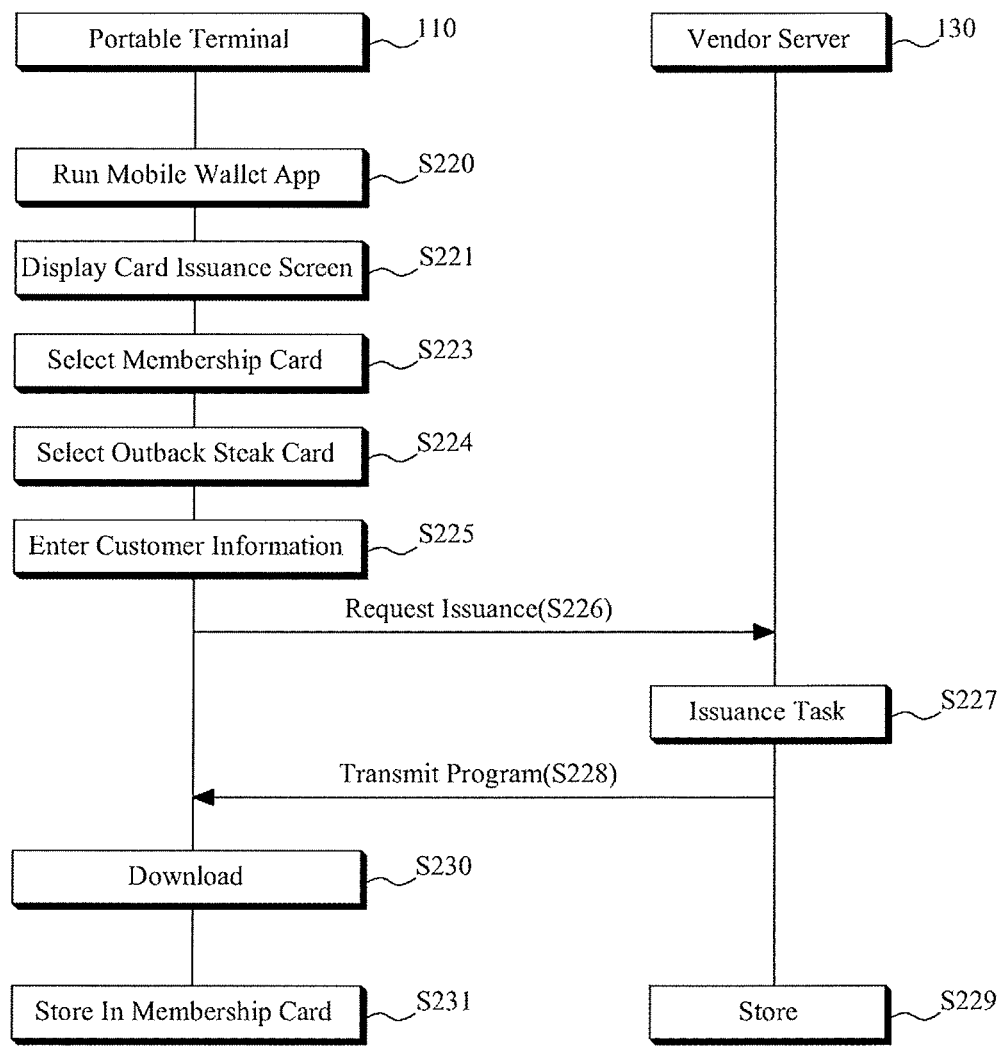

[FIG 5]
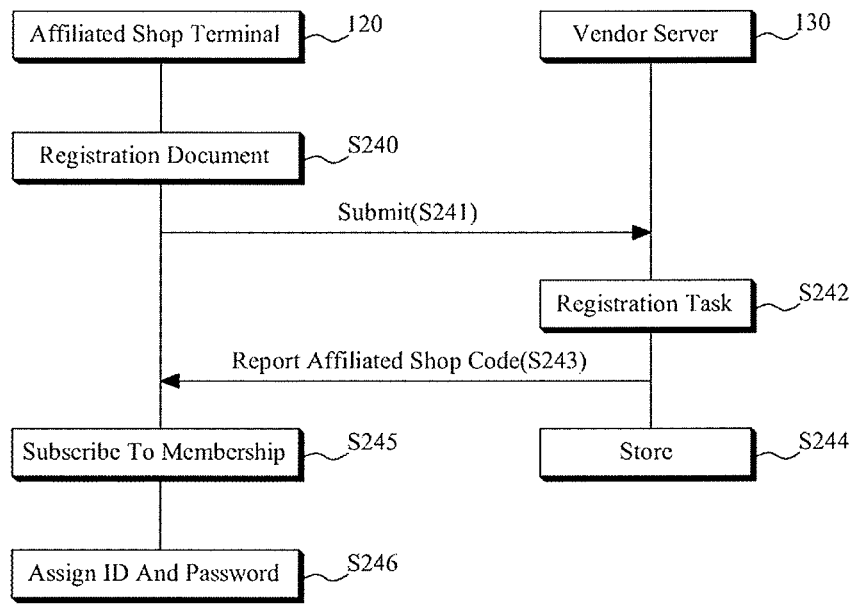
[FIG 6]
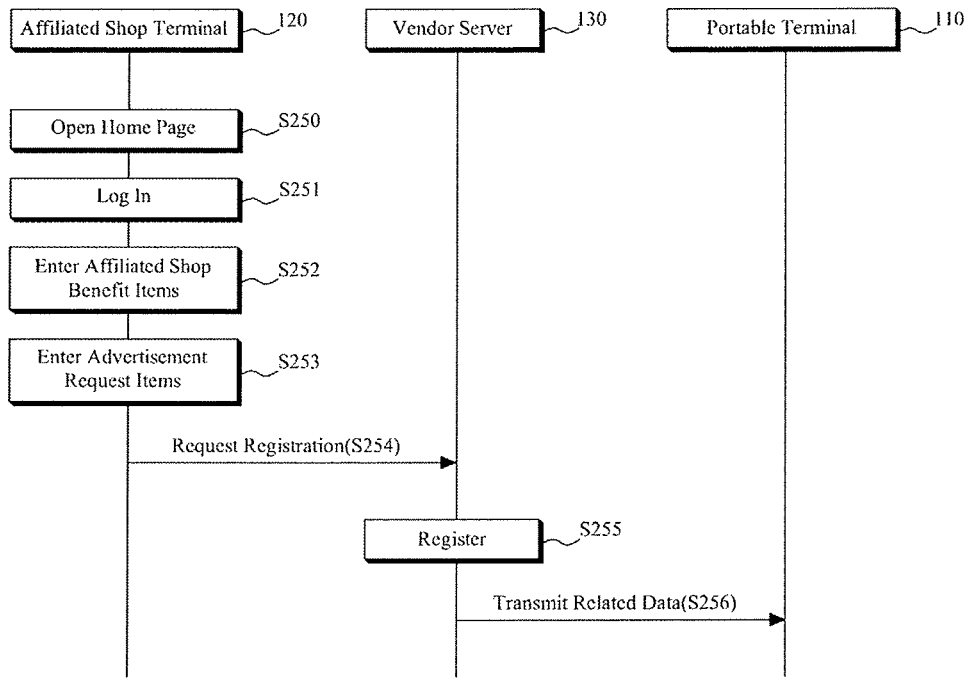

[FIG 7]
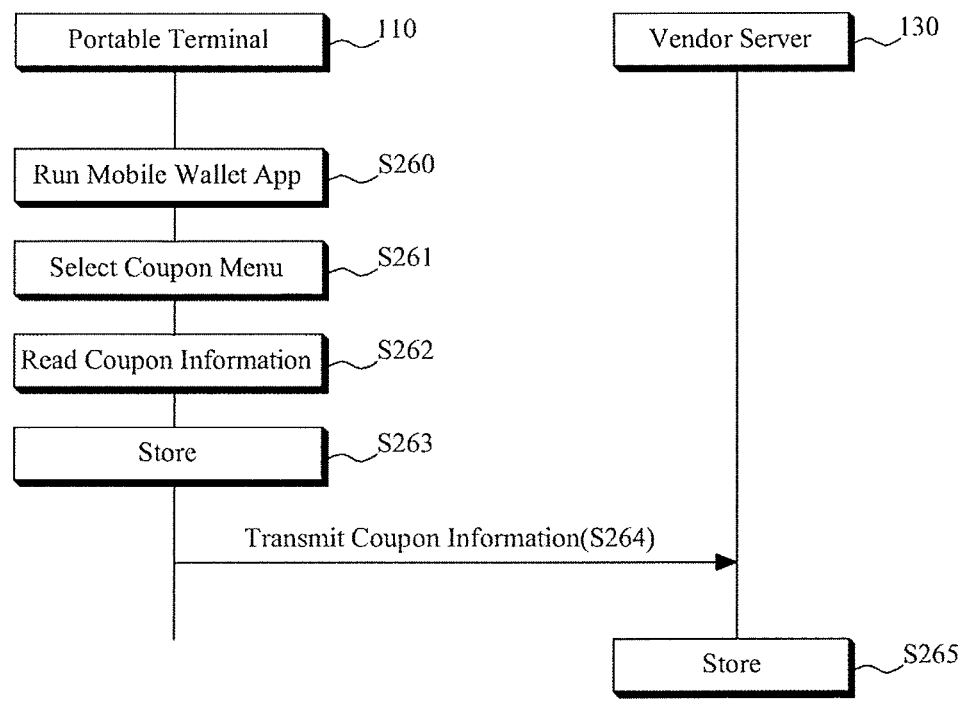

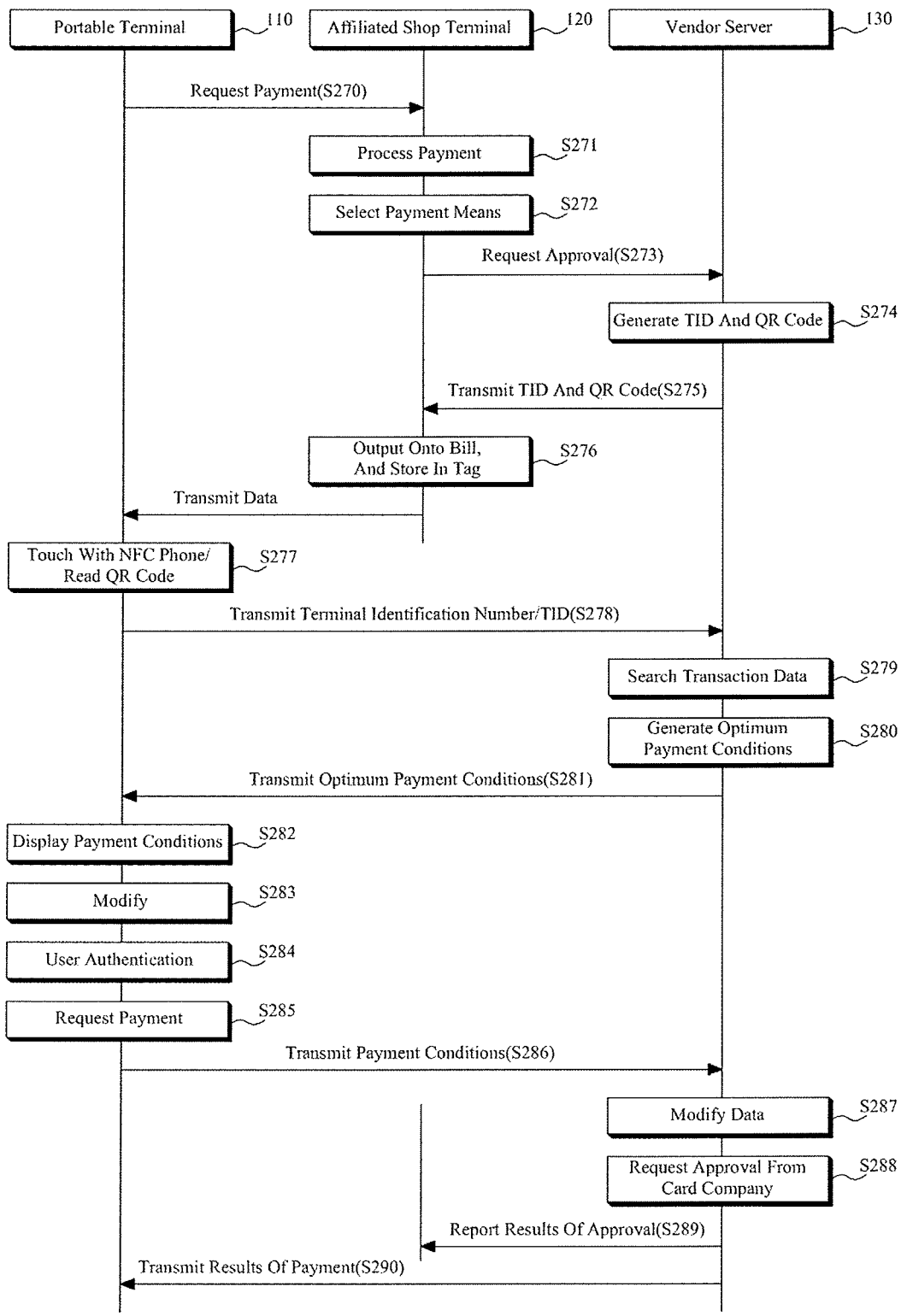

[FIG 9]
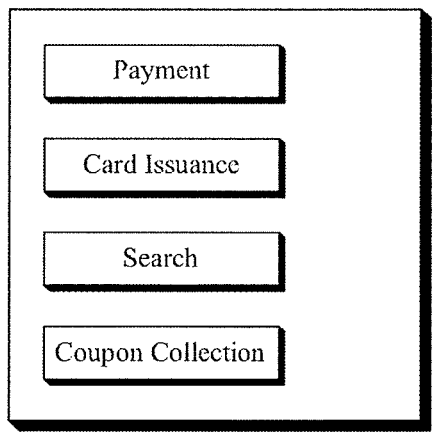
[FIG 10]
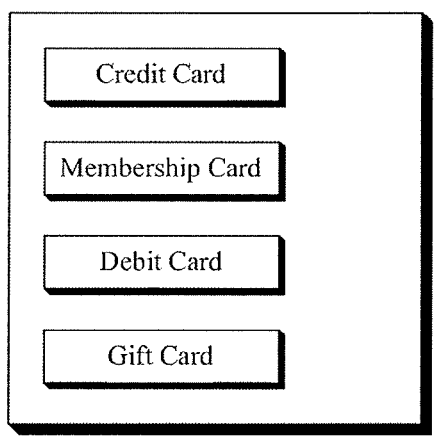
[FIG 11]
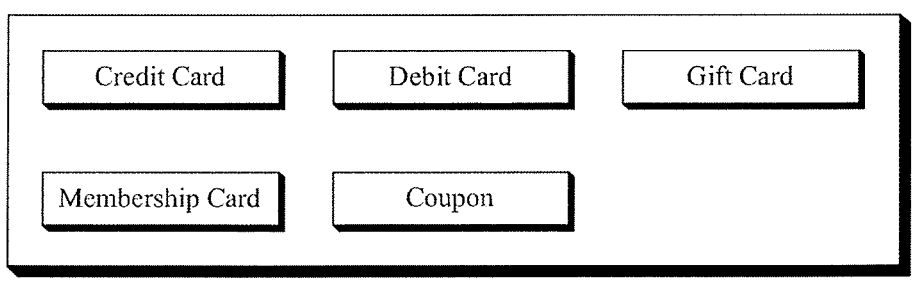

[FIG 12]
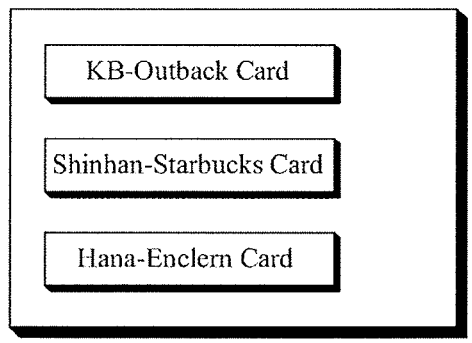

COMPLEX PAYMENT SYSTEM USING A PORTABLE TERMINAL, AND COMPLEX PAYMENT METHOD

TECHNICAL FIELD

The present invention relates, in general, to a payment system and method capable of making payment using a portable terminal and, more particularly, to a complex payment system and method using a portable terminal, which are capable of making payment using bonus information, such as card information, discount information, membership point information, and/or coupon information based on optimum payment conditions in which a minimum payment amount can be obtained.

BACKGROUND ART

Conventional card payment uses a method of obtaining the card number of a purchaser through a connection to the POS of an affiliated shop or via a separate card (a variety of card payment means, such as a credit card, a prepaid card, a debit card, etc.) terminal and then requesting approval from a card company server through a VAN provider by transmitting the card number, together with affiliated shop information and a payment amount.

A conventional card payment system is illustrated in FIG. 1.

When a customer makes a credit-based purchase at a designated affiliated shop, the card reader of the affiliated shop accesses a card issuer server over the network of a VAN provider, obtains approval of card payment, and then completes a transaction.

A card user 10 possesses a card issued by a card company, and an affiliated shop is provided with a common card terminal 20 that accesses a specific VAN provider and transmits payment information. The card terminal 20 and the relay system 30 of the VAN provider are generally connected over a predetermined network (e.g., the telephony Internet), and the relay system 30 of the VAN provider and the transaction approval system 40 of a corresponding card company are generally connected over a dedicated network.

In the case of using an online payment method via an Internet shopping mall instead of an affiliated shop, a payment gateway (PG) 30 performs the role of the VAN provider.

The VAN provider functions to relay purchase information whose approval (or cancellation) has been requested via the card terminal between the affiliated shop and the corresponding card company, and the PG 30 functions to request a payment amount from a payment and settlement company, such as a card company, a bank, or an electronic payment company, under the entrustment of an Internet commerce company, to receive the amount, and to pay the amount to the entrusting company.

When a card holder requests a purchase while presenting his or her card to an affiliated shop in order to pay the price for a commodity, the affiliated shop uses a credit card terminal in order to request approval from a card company. In this case, the card terminal transmits card user information stored in the card of the user, commodity order information generated by the card terminal, a payment amount and affiliated shop information to the VAN provider. The VAN provider receives the information through the relay system 30 of the VAN provider.

The relay system 30 of the VAN provider that has received payment approval request data reads card company information recorded in the user information of the payment approval request data and then transmits transaction approval request-related data to the transaction approval system 40 of the corresponding card company in order to request approval.

The transaction approval system 40 of the card company that has received the transaction approval request-related data checks if the transaction made between the card user and the affiliated shop is valid by comparing the user information, the commodity order information, the payment amount, the affiliated shop information included in the transaction approval request-related data with its membership data or affiliated shop data.

The transaction approval system 40 of the card company transmits the results of the approval of the transaction for the transaction approval request to the relay system 30 of the VAN provider that has relayed the payment approval request, and the relay system 30 of the VAN provider stores approval number data and transmits the approval number data to the corresponding card reader of the corresponding affiliated shop.

Based on the transmitted approval data, the card terminal prints the results of payment on a card receipt and reports the results to the card user.

In this payment method using a card, when a card user provides information, such as a card number, a valid period, and a card issuer, required for card payment approval to a terminal installed at an affiliated shop, the affiliated shop requests transaction approval from a corresponding card company through the VAN provider and then payment is made based on the results of the approval.

However, this conventional method is problematic in that a card user suffers from the inconvenience of having to possess a card to be used, a customer's financial information including a unique payment card number may be exposed to an affiliated shop, a financial accident using a customer's card information may occur, the risk of the illegal reproduction of payment card information by a third party is increasing, and the possibility of the divulgence of personal information may not be avoided.

Furthermore, although a customer always desires to select an optimum payment method that enables payment to be made at a minimum amount and to make payment using the optimum payment method, it is difficult to easily become aware of a variety of benefit information, that is, discount information, membership point information, coupon information, etc., required for payment, and thus a case where the customer is not satisfied with the results of payment occurs.

DISCLOSURE

Technical Problem

Accordingly, the present invention has been made keeping in mind the above problems occurring in the prior art, and an object of the present invention is to provide a complex payment system and method using a portable terminal, which are capable of, upon making payment, receiving payment information registered in a vendor server or information recorded in a dongle and making payment without possessing a card.

Another object of the present invention is to provide a complex payment system and method using a portable terminal, which are capable of, upon making payment, presenting optimum payment conditions.

A further object of the present invention is to provide a complex payment system and method using a portable terminal, which are capable of allowing information, such as coupon information, registered by a customer to be stored and utilized upon making payment.

Yet another object of the present invention is to provide a complex payment system and method using a portable terminal, which are capable of allowing information, such as the discount benefits and membership card information of an affiliated shop, to be stored and utilized upon making payment.

Technical Solution

In order to accomplish the above objects, in accordance with an embodiment of the present invention, there is provided a complex payment system using a portable terminal, the complex payment system using an affiliated shop terminal configured to generate payment information, a portable terminal configured to execute an e-wallet program and to transmit the payment information, and a vendor server configured to store one or more pieces of information selected from among information about a card to be used for payment and coupon information in connection with a terminal identification number of the portable terminal and discount information and/or membership point information in connection with an affiliated shop code as bonus information, wherein the portable terminal transmits the payment information to the vendor server, and the vendor server analyzes payment conditions using one or more pieces of information selected from the bonus information so that a minimum payment amount can be obtained, and transmits the analyzed payment conditions to the portable terminal, thereby allowing payment to be made.

Upon requesting the payment, the affiliated shop terminal may select an electronic wallet as a payment means, may request approval of the payment information from the vendor server, may receive approved payment information, and may then output the approved payment information so that the portable terminal can read the approved payment information. The vendor server may generate a transaction ID (TID) for the payment information requested by the affiliated shop terminal, may convert the payment information including the TID into a QR code, and may transmit the QR code.

The affiliated shop terminal may generate data in order to output the QR code received from the vendor server onto one or more of a bill, a monitor of the affiliated shop terminal and a screen of a sign pad or to store the TID and the payment information in a wireless tag.

In accordance with another embodiment of the present invention, there is provided a complex payment system using a portable terminal, including a portable terminal configured to execute an e-wallet program, and to transmit payment information; an affiliated shop terminal configured to, upon requesting payment, output information about transaction data so that the portable terminal can read the information about transaction data; and a vendor server configured to receive information about a card or a coupon issued to the portable terminal and store the information about a card or a coupon in connection with a unique identification number of the corresponding portable terminal, and to receive discount information or membership point information from the affiliated shop terminal and store the received discount information or membership point information in connection with a corresponding affiliated shop code; wherein the vendor server is operative to, when the portable terminal requests payment, analyze payment conditions using one or more pieces of information selected from among card information, discount information, membership point information and coupon information so that a minimum payment amount can be obtained, and transmit the analyzed payment conditions to the portable terminal.

In order to accomplish the above objects, in accordance with an embodiment of the present invention, there is provided a complex payment method using a portable terminal, the method using a portable terminal configured to execute an e-wallet program and transmit payment information, a vendor server configured to store one or more pieces of information selected from among information about a card to be used for payment and coupon information in connection with a terminal identification number of the portable terminal and discount information and/or membership point information in connection with an affiliated shop code as bonus information, and an affiliated shop terminal configured to, upon requesting payment, output information about transaction data so that the portable terminal can read the information about transaction data, the method including (a) transmitting, by the portable terminal, payment information to the vendor server; (b) generating, by the vendor server, payment conditions using one or more pieces of information selected from the bonus information based on a transmitted payment amount so that a minimum payment amount can be obtained; and (c) making, by the vendor server, payment based on the generated payment conditions.

Payment conditions may be generated using one or more pieces of information selected from among card information, discount information, membership point information and coupon information of the bonus information so that the minimum payment amount can be obtained.

In accordance with still another embodiment of the present invention, there is provided a complex payment system using a portable terminal, including an affiliated shop terminal of an affiliated shop configured to generate payment information including a payment amount; a portable terminal configured to read the payment information from the affiliated shop terminal of the affiliated shop and then transmit the read payment information, and to store information about an issued card or coupon; and a vendor server configured to receive discount information and/or membership point information from the affiliated shop terminal of the affiliated shop, to store the discount information and/or the membership point information in connection with a corresponding affiliated shop code, and to make payment in conjunction with a card company; wherein when the portable terminal reads the payment information from the affiliated shop terminal and then requests payment, the vendor server transmits discount information and/or membership point information of a corresponding affiliated shop, and the portable terminal analyzes payment conditions using one or more pieces of information selected from among discount information, membership point information, card information, and/or coupon information received from the vendor server so that a minimum payment amount can be obtained, and displays the analyzed payment conditions, the payment conditions being configured to be transmitted to the vendor server, thereby allowing payment to be made based on the payment conditions.

In accordance with still another embodiment of the present invention, there is provided a composite payment method using a portable terminal, the method using an affiliated shop terminal of an affiliated shop configured to generate payment information including a payment amount, a portable terminal configured to execute an e-wallet program, to read payment information from the affiliated shop terminal, to transmit the payment information, and to store information about an issued card and/or coupon, and to receive discount information and/or membership point information from the affiliated shop terminal of the affiliated shop, to store the discount information and/or the membership point information in connection with a corresponding affiliated shop code, and to make payment in conjunction with a card company, the method including (a) requesting, by the portable terminal, payment from the vendor server; (b) transmitting, by the vendor server, discount information and/or membership point information of a corresponding affiliated shop; (c) generating, by the portable terminal, payment conditions using one or more pieces of information selected from among the discount information and the membership point information received from the vendor server and the stored card and/or coupon information so that a minimum payment amount can be obtained; and (d) receiving the payment conditions, and making, by the vendor server, the payment.

Advantageous Effects

The complex payment system and method using a portable terminal according to the present invention has the advantage of making payments without the leakage of personal financial information because upon making payment, the information of the vendor server or the dongle is received and then payment information is processed.

Furthermore, the complex payment system and method using a portable terminal according to the present invention has the advantage of allowing a customer to make an appropriate selection in accordance with a situation and then make payment because upon making payment, the customer can be presented with optimum payment conditions in which discount benefits, such as discount information and/or membership information, have been considered.

Moreover, the complex payment system and method using a portable terminal according to the present invention has the advantage of making payment most economical because coupon information and/or membership information are registered and then used and, thus, various discount benefits can be automatically received.

DESCRIPTION OF DRAWINGS

FIG. 1 is a diagram illustrating a conventional affiliated shop-centric card payment method that is performed via an affiliated shop terminal and a VAN provider;

FIG. 2 is a diagram of principal components of a complex payment system using a portable terminal according to an embodiment of the present invention;

FIG. 3 is a flowchart illustrating the process of being issued an affiliated shop card according to the present invention;

FIG. 4 is a flowchart illustrating the process of being issued a membership card according to the present invention;

FIG. 5 is a flowchart illustrating the process of registering an affiliated shop according to the present invention;

FIG. 6 is a flowchart illustrating the process of registering an affiliated shop benefit and advertisement according to the present invention;

FIG. 7 is a flowchart illustrating the process of registering coupon information according to the present invention;

FIG. 8 is a flowchart illustrating the process of processing payment according to the present invention;

FIG. 9 is a diagram illustrating an example of an initial screen that is displayed when an electronic wallet according to the present invention is run;

FIG. 10 is a diagram illustrating a card issuance screen according to the present invention in detail;

FIG. 11 is a diagram illustrating a search screen according to the present invention in detail; and FIG. 12 is a diagram illustrating a membership screen according to the present invention in detail.

MODE FOR INVENTION

The terms and words used in the present specification and the attached claims should not be limitedly interpreted as having their common meanings or those found in dictionaries, but should be interpreted as having meanings suitable for the technical spirit of the present invention based on the principle that an inventor may appropriately define the concepts of terms in order to describe his or her invention in the best way.

Throughout the specification, when an element "includes" another element, it means that the element excludes other elements but may further include other elements as long as the opposite description is not particularly made. Furthermore, the term "unit," "-or(er)," "module," or "device" described in the specification refers to a unit component configured to process at least one function or operation. A unit, a -or(er), a module, or a device may be implemented using hardware or a combination of hardware and software.

The terms used hereinbelow will be described as follows:

The term "transaction identification" is also referred to as a TID, and is a unique transaction number that is generated when a portable terminal, such as a smart phone, or an affiliated shop terminal requests payment. A TID generally has 40 digits, and is used upon tracking error, making a search, or canceling a transaction.

The term "affiliated shop code" refers to a code that is assigned to each affiliated shop registered in the vendor server of Harex and includes English letters, numbers or a combination thereof. The vendor server identifies the affiliated shop using this affiliated shop code, and generates a TID when a corresponding transaction occurs and stores and manages requested transaction data in connection with the corresponding affiliated shop code.

The term "terminal identification number" refers to the identification number of a portable terminal, such as a smart phone. A unique identification number identified for each portable terminal and a personal ID used for the authentication of each portable terminal are all used as the terminal identification number.

The term "bonus information" refers to additional information that is used upon making payment, that is, one or more pieces of information selected from among coupon information in connection with a terminal identification number and discount information and/or membership point information in connection with an affiliated shop code.

An embodiment of the present invention will be described with reference to the drawings.

FIG. 2 is a diagram of principal components of a complex payment system using a portable terminal according to an embodiment of the present invention. As illustrated in this drawing, the complex payment system using a portable terminal may be configured to include an affiliated shop terminal 120 configured to generate and provide payment information; a portable terminal 110 configured to execute an e-wallet program, to receive payment information and to request approval of payment; and a vendor server 130 configured to store information about a card to be used for payment and coupon information for the terminal identification number of the portable terminal 110, to store one or more pieces of information, such as discount information and membership point information, as bonus information in accordance with an affiliated shop code, and to request approval from a corresponding card company server 150 over the Internet 160 in response to the request for payment from the portable terminal 110.

When a customer attempts to make payment using the portable terminal 110, the complex payment system using a portable terminal operates to execute an e-wallet program (hereinafter referred to as the "mobile wallet app") installed in the corresponding terminal, to request optimum payment conditions by transmitting payment information read from a QR code or a wireless tag (an RF tag, an NFC tag, or the like), which is provided by the affiliated shop terminal 120, to the vendor server 130, to receive and display optimum payment conditions including a minimum payment amount received from the vendor server 130, and to request final payment from the vendor server 130 by transmitting the determined optimum payment conditions to the vendor server 130, thereby allowing payment to be made.

A smart electronic wall used in the portable terminal 110 is obtained by downloading and installing a "mobile wallet app" program.

The customer visits an app store or an app marketplace to install a "smart wallet app" program on the portable terminal 110, downloads and installs the "smart wallet app" program, and executes a "mobile wallet app," so that an e-wallet program is run.

That is, when the "mobile wallet app," which is an e-wallet program, is executed on the portable terminal 110, the following operation is performed. As illustrated in the drawing of FIG. 9 illustrating an initial screen that is displayed when the electronic wallet of the present invention is run as an example, when the "mobile wallet app" is executed, one or more of a "payment" box which can be selected upon making payment, a "card issuance" box which can be selected upon requesting the issuance of a new card, a "search" box through which information about a possessed card, a possessed coupon or the like can be searched for, and a "coupon collection" box through which information about coupons or the like can be collected are displayed on the initial screen.

For example, when the "payment" box is selected, an RF (NFC) reader or a QR code reader may be activated and read information recorded in an RF (NFC) tag or a QR code in which payment information has been recorded, and the read information may be displayed on a screen and then used for payment. Meanwhile, when the customer executes the electronic wallet, the electronic wallet is mostly used for payment. Therefore, it is preferred that information be automatically read from an RF (NFC) tag or a QR code when the "mobile wallet app" is executed on the portable terminal 110 (or when the wallet app is automatically executed by touching an NFC dongle).

When the customer selects the "card issuance" box, the types of cards that the customer can be issued are listed in a form in which a "credit card" box, "membership card" box, "debit card" box, and a "gift card" box are displayed, so that the customer can be issued a necessary card, as illustrated in the drawing of FIG. 10 illustrating the card issuance screen of the present invention in greater detail.

A detailed card issuance method will be described below.

Furthermore, when the "search" box is selected on the initial screen on which the "mobile wallet app" is executed, cards to be issued are displayed using boxes for the types of cards (a credit card, a debit card, a gift card, a membership card, a coupon, etc.), as illustrated in the drawing of FIG. 11 illustrating the search screen of the present invention in greater detail. For example, when the "membership card" is selected, the types of membership card that the customer has been issued are listed in a form in which a "KB-Outback card", "a Shinhan-Starbucks card" and a "Hana-Enclean card" are displayed, as illustrated in the drawing of FIG. 12 illustrating the membership screen of the present invention in greater detail.

Furthermore, it will be apparent that when any one is selected from among the above cards, information required for the use of the card, such as the details of payment made by the corresponding card and available affiliated shops, may be made to be displayed.

Although information displayed in the "search" box may be stored and displayed in and on the portable terminal 110 itself, it is preferred that when the "mobile wallet app" is executed, the portable terminal 110 access the vendor server 130 of Harex, receive information about a possessed card, a possessed coupon or the like, and display it.

Meanwhile, it is preferred that images of downloaded App cards be displayed on credit card, debit card, gift card, membership card and coupon boxes displayed in the "search" box, so that the customer can easily and frequently check the details of a possessed card, a possessed coupon or the like. Additionally, it is preferred that when the customer clicks on a corresponding image, the details of payment, available affiliated shops, and affiliated shop benefits/advertisements can be searched for.

For example, when the image of the KB-Outback card is selected, the function of searching for the details of payment, bonus points, a bill, and affiliated shops related to the KB-Outback card may be performed.

These functions are tasks that are performed in conjunction with a card company, and descriptions of the details thereof are omitted. Upon touching a corresponding card, an ID or a terminal identification number issued upon download may be read, branching off to a corresponding card company may be performed, and related data is collected and displayed.

Furthermore, it is preferred that when the Outback membership card is selected, remaining bonus points and the details of use, and affiliated shops where bonus points can be used can be searched for. Additionally, it is preferred that in a coupon room, collected coupons are stored in image form and also used coupons are not displayed for ease of identification.

Meanwhile, the portable terminal 110 is configured to display optimum payment conditions including a minimum payment amount analyzed and transmitted by the vendor server 130, and to request payment based on the displayed optimum payment conditions or to change one or more payment conditions of discount information, membership point information and coupon information and then request payment.

The reason for this is to allow the customer to appropriately modify payment conditions in accordance with a situation even when the vendor server 130 performs analysis and transmission so that a payment amount obtained by analyzing coupon information, discount information, or membership point information stored for each terminal identification number or affiliated shop code becomes a minimum payment amount.

In particular, although the portable terminal 110 may receive card information to be used for payment from the vendor server 130 and display the card information, it may be possible to execute the "mobile wallet app," to display possessed information of available services received from a dongle, particularly cards and services to be used for payment, and to allow the customer to select a card and a service and use them to make payment.

The dongle is a device that guarantees that only an authorized user can copy or use a specific software application, and refers to a relay device that enables a specific function to be used by connecting two devices having different functions.

The affiliated shop terminal 120 is a terminal through which an affiliated shop registered with the vendor server 130 performs payment while exchanging payment-related information, like a common affiliated shop POS. The affiliated shop terminal 120 is configured to, when the customer having the portable terminal 110 requests payment, select an electronic wallet as a payment means, request approval of transaction data from the vendor server 130, receive the approval transaction data, and generate payment information including a payment amount.

Although the affiliated shop terminal 120 may have its own server, may store information required for payment and may read and use the stored information, the affiliated shop terminal 120 is described as storing and managing all information without a separate server for ease of description in an embodiment of the present invention.

Furthermore, the affiliated shop terminal 120 outputs a TID received from the vendor server 130 and payment information including a QR code including the TID to a bill, the monitor of the affiliated shop terminal or the screen of a sign pad, and generates data so that the data can be stored in a wireless tag.

Accordingly, when the portable terminal 110 transmits a QR code provided by the affiliated shop terminal 120 and payment information read from the wireless tag to the vendor server 130, and the vendor server 130 analyzes payment conditions so that a minimum payment amount is obtained based on transmitted payment information to the portable terminal 110, the portable terminal 110 returns checked payment conditions to the vendor server 130, so that payment can be made.

The vendor server 130 operates to classify and store card information or coupon information that the portable terminal 110 has been issued in connection with the terminal identification number of the corresponding portable terminal 110, and to classify and store registered discount information or membership point information received from the affiliated shop terminal 120 of the affiliated shop in connection with the code of the corresponding affiliated shop.

This information is classified as bonus information, and is used to analyze optimum payment conditions when the portable terminal requests payment.

First, when the vendor server 130 receives a request for approval of transaction data from the affiliated shop terminal 120, the vendor server 130 generates a TID for the corresponding transaction data with respect to the affiliated shop code of the corresponding affiliated shop terminal 120, stores the TID-based transaction data, converts the TID and the transaction data into a QR code, and transmits the QR code to the affiliated shop terminal 120.

Although in an embodiment of the present invention, the TID and the transaction data have been described as being converted into a QR code for ease of description, it will be apparent that the present invention is not limited thereto and barcode or another type of payment-dedicated code may be employed.

Meanwhile, while the vendor server 130 may generate the QR code and transmit it to the affiliated shop terminal 120, the affiliated shop terminal 120 may converts the TID and the transaction data into the QR code by itself when receiving the TID from the vendor server 130.

A detailed description thereof will be given below.

Furthermore, the vendor server 130 is configured to be connected at the same time the portable terminal 110 touches an NFC phone or reads the QR code, to obtain the terminal identification number, the TID and the affiliated shop code, to compare the transaction data stored in connection with the TID, to read the card information and the coupon information stored in connection with the terminal identification number, to analyze the payment conditions using the discount information or membership point information registered in connection with the affiliated shop code so that a minimum payment amount can be obtained, and to transmit resulting payment conditions to the portable terminal 110.

Furthermore, the vendor server 130 operates to read the information used for payment from the discount information, membership point information or coupon information payment based on the payment conditions requested by the portable terminal 110, to modify stored related data, and to store the modified data so that the modified data can be used later.

In this case, approval of a payment amount is requested from the card company server 150 of the card selected for payment by the portable terminal 110, and the results of the approval are transmitted to the affiliated shop terminal 120 and, simultaneously, the results of the approval and the modified bonus information are transmitted to the portable terminal 110, so that the customer who possesses the portable terminal 110 can check the bonus information.

Using this configuration, a complex payment system and method using a portable terminal according to the present invention will be described with reference to the accompanying drawings below.

FIG. 3 is a flowchart illustrating the process of being issued an affiliated shop card according to the present invention. As illustrated in FIG. 3, in the present invention, the process of being issued an affiliated shop card using a portable terminal starts with card issuance request step S201 of executing the "mobile wallet app" on the portable terminal 110.

In greater detail, when the electronic wallet initial screen of FIG. 9 is displayed by executing the "mobile wallet app," the "card issuance" box is selected, and the "credit card," which is a card to be issued, is selected on the card issuance screen of FIG. 10.

An embodiment of the present invention corresponds to a case where the customer eats at an Outback Steak House shop and becomes aware of the fact that a 10% discount is given when payment is made using a "KB Outback app card." The following description will be given using a case where a customer ledger is present in a KB card company as an example.

The customer enters authentication data required for the issuance of a card, such as the card number, valid period, CVC, and password of the possessed plastic KB card at step S202, and requests authentication by transmitting the data to the card company server 150 of KB Kookmin Bank at step S203.

The card company server 150 from which authentication has been requested by the portable terminal 110 performs an authentication procedure and transmits the results of the approval to the portable terminal 110 at steps S204 to S205.

Since the authentication procedure and the approval procedure are common, detailed descriptions thereof will be omitted.

The portable terminal 110 that has received the results of the approval from the card company server 150 selects a "KB Outback app card" at step S206, and requests the issuance of a card from the card company server 150 at step S207.

When the card company server 150 performs the task of the issuance of a card at step S208 and transmits a program for the installation of the issued "KB Outback app card" to the portable terminal 110 at step S209, the portable terminal 110 downloads and installs the corresponding program, and the installed card operates to be stored in the "credit card" box of the "search" box as a "KB Outback app card" and to be used upon making a search.

Furthermore, the portable terminal 110 is configured to store the issued "KB Outback app card" and, simultaneously, transmit corresponding information to the vendor server 130, so that the vendor server 130 can convert the issued card into a code and store the issued card in code form in connection with the corresponding terminal identification number.

Through the repetition of this method, the desired affiliated shop card is issued and then stored in the "credit card" box, that is, a corresponding storage space, so that corresponding data may be read and used upon making payment or may be used upon making a search.

The process of being issued a membership card will be described with reference to the accompanying drawings below.

FIG. 4 is a flowchart illustrating the process of being issued a membership card according to the present invention. As illustrated in FIG. 4, in the present invention, the process of being issued a membership card using a portable terminal starts with card issuance request step S220 of executing the "mobile wallet app" on the portable terminal 110.

In this embodiment, a setting in which the customer is issued an "Outback Steak membership app card" is made and described for ease of description.

In greater detail, when the "mobile wallet app" is executed, the "card issuance" box, which corresponds to a card issuance screen, is selected on the electronic wallet initial screen of FIG. 9 at step S221, a "membership card," which is a card to be issued, is selected on the display card issuance screen of FIG. 10 and the "Outback Steak card" is selected at steps S223 to S224.

Preferably, when the customer selects the membership card or executes the "mobile wallet app," the portable terminal 110 is adapted to receive and display information about the types of membership cards registered in the vendor server 130 and information about a screen in which information required for the issuance of a card can be entered.

The information required for the issuance of a card is transmitted from the affiliated shop terminal to the vendor server and registered in the vendor server. This registration process will be described in detail below.

Once the Outback Steak card has been selected as a card to be issued at step S224, the portable terminal 110 displays an information entry screen required for the issuance of the corresponding card, and the customer enters corresponding information at step S225, and requests the issuance of the membership card from the vendor server 130 at step S226.

The vendor server 130 from which the issuance of a membership card has been requested at step S226 performs an issuance task and then transmits a program for the installation of the "Outback Steak membership app card" to the portable terminal 110 at steps S227-S228.

Furthermore, the vendor server 130 converts the issued "Outback Steak membership card" into a code and stores the code in its own storage in connection with the corresponding terminal identification number at step S229.

Thereafter, the portable terminal 110 downloads and installs the program for the installation of the "Outback Steak membership app card" and stores the installed card as the "Outback Steak membership card" in the "membership card" screen of the "search" box, so that the stored information can be used upon making a search at steps S230 to S231.

Although the issuance of the membership card may be directly performed by the vendor server 130, as described above, it may be mediated by the vendor server 1302 in the case where the membership card is directly issued by an Outback server (a corresponding membership server). In this case, an issuance procedure is performed in a manner similar to that of the credit card issuance procedure.

The process of registering an affiliated shop will be described with reference to the accompanying drawing below.

FIG. 5 is a flowchart illustrating the process of registering an affiliated shop according to the present invention. As illustrated in FIG. 5, in the process in which the proprietor of an affiliated shop performs registration using the affiliated shop terminal according to the present invention, when the proprietor of the affiliated shop enters data required for the registration of the affiliated shop via the affiliated shop terminal 120 and requests registration from the vendor server 130 at steps S240 to S241, the vendor server 130 displays an affiliated shop registration screen and performs the task of registration using the data used for the request for registration at step S242.

In the task of registration, an affiliated shop code is assigned in connection with the corresponding affiliated shop terminal.

The affiliated shop code registered at step S242 is reported to the affiliated shop terminal 120 at step S243. The proprietor of the affiliated shop accesses the website of Harex, which is operating the vendor server 130, using the assigned affiliated shop code, subscribes to membership, and registers an ID and a password, thereby completing the process of registering an affiliated shop at steps S245 to S246.

The process of registering an advertisement or a discount benefit using the affiliated shop terminal will be described with reference to the accompanying drawing below.

FIG. 6 is a flowchart illustrating the process of registering an affiliated shop benefit and advertisement according to the present invention. As illustrated in FIG. 6, in the present invention, the process of registering an affiliated shop benefit and advertisement starts with steps S250 and S251 of logging in to the website of the vendor server 130 registered in the process of registering an affiliated shop using the ID and the password.

Thereafter, affiliated shop benefit details and advertisement request details are registered at steps S252 and S253.

In this embodiment, the case of registering the following affiliated shop benefit details, that is, 1) "KB-Outback card, 10% discount, Mar. 1, 2011 to Jun. 30, 2011", 2) "Outback membership point 3% accumulated, points available for up to 10,000 won," and 3) "single Outback coupon available for single transaction," will be described for ease of description.

Once the affiliated shop benefit details and the advertisement request details have been entered at steps S252 and S253, the registration of the corresponding details are requested from the vendor server 130 at step S254.

In this case, the affiliated shop code is transmitted together.

The vendor server 130 from which the affiliated shop terminal 120 has requested the registration registers the benefit details and the advertisement details in connection with the corresponding affiliated shop code at step S255, and transmits the registered benefit details and the advertisement details to the portable terminal 110 at step S256, so that the customer who possesses the portable terminal 110 may become aware of the benefit details and the advertisement details and use the details to use the card or make payment.

The process of collecting coupons using the portable terminal will be described with reference to the accompanying drawing below.

FIG. 7 is a flowchart illustrating the process of registering coupon information according to the present invention. As illustrated in FIG. 7, in order to collect coupons, the "mobile wallet app" of the portable terminal 110 is executed, the "coupon collection" box is selected on the electronic wallet initial screen, and displayed coupon information is read at steps S260 to S262.

Such coupon information may correspond to a QR code or an NFC (near field communication) tag. When the "coupon collection" box of the portable terminal is activated, the portable terminal operates to activate an internal device so that the internal device can read a QR code or read information from an NFC tag, thereby collecting coupon information.

Since the technology of reading a QR code or reading information from an NFC tag is common, a detailed description thereof will be omitted.

In this embodiment, the following scenario will be described for ease of description. Company employee A who possesses an NFC smart phone as a portable terminal is a customer who has downloaded and is using a smart wallet app and has the experience of going to eat out at an Outback Steak House shop. Company employee A receives a message stating that "Outback Steak House starts to issue 1,000 won discount coupons at 10 A.M. on Jun. 1, 2011."

Such a message is transmitted to the portable terminal 110 by the vendor server 130 when the affiliated shop benefit or advertisement has been registered using the affiliated shop terminal, as described above.

Company employee A calls his wife on his way home to ask her to eat out, promises to meet her at an Outback Steak House Sanbon shop, finds a coupon (an NFC tag) while viewing an Outback Steak advertisement in the subway on his way home, and runs the smart wallet app to collect the coupon at step S260 (in the case of an NFC tag, information is made to be collected by bringing his mobile phone into contact with the tag.

The "coupon collection" box of the smart electronic wallet is selected, and coupon information is read by touching the NFC tag with the portable terminal 110 and then stored in a coupon folder, so that the coupon information can be searched for later at steps S261 to S263.

Furthermore, the read coupon information is transmitted to the vendor server 130, so that the coupon information is stored and managed in connection with the terminal identification number, and a corresponding image is downloaded and stored in the coupon area of the smart electronic wallet of company employee A at steps S264 to S265.

The discount information, advertisement information, coupon information, etc. registered in the vendor server 130 in connection with the terminal identification number in the above-described process are transmitted to the portable terminal at the request of the portable terminal 110 for information, or are used when the information is analyzed such that a minimum payment amount is obtained upon requesting payment.

Although the coupon information has been described as being stored in the vendor server and being used upon making payment in this embodiment, it will be apparent that it may be possible to provide a separate coupon server and configure the coupon server to issue and manage coupons.

The process of making payment so that a minimum payment amount is obtained upon making payment using the bonus information registered using the above-described method.

FIG. 8 is a flowchart illustrating the process of processing payment at a minimum payment amount according to the present invention. As illustrated in FIG. 8, this process starts when the customer who possesses the portable terminal 110 expresses his or her intention to make payment using an electronic wallet to a shop assistant.

In this embodiment, a description will be given by using, as an example, the process in which customer A who possesses an NFC smart phone as the portable terminal 110 has a meal and then makes payment at an Outback Steak House shop as a customer who has the experience of eating out at an Outback Steak House shop while using a downloaded "smart wallet app".

Customer A expresses his or her intention to make payment using the smart electronic wallet while sitting at a table after having the meal and requesting payment from a shop assistant at step S270. In this case, a payment amount is set to 30,000 won.

The shop assistant selects the smart electronic wallet as a payment means while performing a payment process for the table at which corresponding customer A has had a meal at a counter at which the affiliated shop terminal 120 is placed at steps S271 to S272, and then requests approval of transaction data by transmitting the transaction data including an affiliated shop code and a transaction amount to the vendor server 130 at step S273.

The vendor server 130 that has received the request for approval generates and stores the TID of a corresponding transaction and then generates a QR code using the generated TID and the transaction data at step S274, and transmits the generated QR code and the TID to the affiliated shop terminal 120 at step S275.

Although the QR code has been described as including the TID at step S274, it will be apparent that the TID may not be included in the QR code but may be separately transmitted and then read.

When the affiliated shop terminal 120 that has received the QR code including the TID at step S275 outputs the TID and/or the QR code onto a bill, onto the monitor of the affiliated shop terminal or onto the screen of a sign pad or stores the TID and/or the QR code in an RF tag and then the output is brought to the customer at step S276, the customer executes the "mobile wallet app" of the portable terminal 110 first in order to read payment information from the bill or RF tag in which the QR code has been recorded, which is presented by the shop assistant, and then selects the "payment" box on the initial screen of the electronic wallet, thereby allowing the payment information to be read from the QR code or RF tag at step S277.

In this case, the NFC portable terminal is operated such that the app is executed at the moment of touching the NFC tag with the portable terminal without executing the app and, simultaneously, the payment information is read.

Preferably, when the "mobile wallet app" is executed and the "payment" box is selected on the initial screen of the electronic wallet, an RF reader or a QR code reader may be selected and then the information may be read.

Alternatively, since the customer executes the "mobile wallet app" to use it mostly in order to make payment, it is more preferred that when the "mobile wallet app" is executed, a screen that enables the information to be read from the QR code or RF tag is automatically activated.

In this case, the information read from the QR code or RF tag may be an affiliated shop code, a TID, a transaction amount, etc.

When the customer runs the "smart wallet app," and reads the QR code from the bill, from the monitor of the affiliated shop terminal, or from the screen of a sign pad or touches the RF tag with the portable terminal 110, a connection with the vendor server 130 of Harex is automatically established and one or more pieces of information, such as the terminal identification number, the TID, the affiliated shop code, and/or the transaction amount (30,000 won), required for payment are transmitted to the vendor server 130 at step S278.

The reason for this is that in particular, the vendor server 130 can find the payment amount using the TID even when the payment amount is not transmitted from the portable terminal 110 to the vendor server 130.

The vendor server 130 searches for a TID generated and stored at step S274 using the transmitted TID and generates and compares transaction data at step S279, and the vendor server 130 also generates optimum payment conditions based on the transaction data at step S280.

In the present invention, the optimum payment conditions are payment conditions in which a minimum payment amount can be obtained using a variety of discount information, coupon information, card information, etc.

For example, the case where information including a 10% discount for a KB-Outback card, available membership points corresponding to 10,000 won, and a 1,000 won coupon has been stored in the vendor server 130 as bonus information and a payment amount is 30,000 won will be described as an example.

The vendor server 130 generates optimum payment conditions in which a minimum payment amount can be obtained using the discount information, the membership point information and/or the coupon information based on a payment amount of 30,000 won.

In this case, when the customer A receives a 10% discount of a payment amount by using his or her possessed KB-Outback card, a payment amount becomes 27,000 won. When the membership points corresponding to 10,000 won are deducted from the above payment amount, a resulting payment amount becomes 17,000 won. In turn, when the coupon is used, the resulting amount is discounted by 1,000 won, a minimum payment amount becomes a 16,000 won.

That is, the vendor server 130 calculates a minimum payment amount based on a payment amount of 30,000 won using the following equation:

$$\text{Minimum payment amount} = \text{payment amount} * \text{discount rate of card to be used} - \text{membership points} - \text{coupon} \quad (1)$$

The optimum payment conditions including the minimum payment amount obtained through the analysis of the vendor server 130 are transmitted to the portable terminal 110 and are then displayed so that the customer can check them at steps S281 and S282.

The customer who has checked the displayed optimum payment conditions changes the details of payment when desiring to change the checked payment conditions at step S283, performs user identity authentication, such as one-touch or PIN authentication, when desiring to make payment based on finally determined payment conditions at step S284, and then requests payment from the vendor server 130 at step S285.

For example, in the case where the customer desires to change the optimum payment conditions transmitted by the vendor server 130, when the customer desires to use only membership points corresponding to 5,000 won and not to use the coupon, changes an amount corresponding to membership points to be used to 5,000 won and selects the non-use of the coupon, a payment amount is automatically calculated as 22,000 won and then displayed, and the changed payment conditions are transmitted to the vendor server 130.

Once the payment has been requested at step S285, the vendor server 130 of Harex receives the payment conditions at step S286, requests payment for point corresponding to 10,000 won from the affiliated shop terminal 120 acting as an Outback server, obtains approval, and modifies the data stored in connection with the terminal identification number by checking 1,000 won in the Outback coupon at step S287.

Furthermore, approval of a payment of 16,000 won is requested from KB card company, that is, the card company server 150 at step S288, the results of the approval are reported to the affiliated shop terminal at step S289, and the results of the payment including the results of the approval, the particulars of discounts, remaining membership points information, or coupon information are transmitted to the portable terminal 110 at step S290.

Although the method of analyzing optimum payment conditions using the vendor server 130, transmitting the optimum payment conditions to the portable terminal and making payment has been described, a system and method for analyzing optimum payment conditions using the portable terminal itself and making payment will now be described.

Since the configuration of the system and method is the same as the above-described configuration of analyzing optimum payment conditions using the vendor server except for some components, the same reference symbols will be used and the different functions will be chiefly described.

The system for analyzing optimum payment conditions using the portable terminal 110 may be configured to include an affiliated shop terminal 120 configured to generate payment information including a payment amount; a portable terminal 110 configured to read the payment information from the affiliated shop terminal 120, to transmit the payment information, and to store issued card information or coupon information therein; and a vendor server 130 configured to receive the discount information or membership point information of a corresponding affiliated shop from the affiliated shop terminal 120, to store the information in connection with a corresponding affiliated shop code, and to make payment in conjunction with a card company.

When the portable terminal 110 reads the payment information of the affiliated shop terminal 120 and requests payment, the vendor server 130 searches for discount information and membership point information stored in connection with the affiliated shop code of the corresponding affiliated shop terminal and transmits the found information to the portable terminal 110, and the portable terminal 110 analyzes payment conditions using one or more of the discount information and the membership point information received from the vendor server 130 and the stored coupon information so that a minimum payment amount can be obtained, displays the payment conditions, and then transmits the determined payment conditions to the vendor server 130, thereby allowing payment to be made.

The vendor server 130 is configured to modify information that belongs to the discount information and the membership point information or the coupon information and has been used for payment in the portable terminal 110 based on the payment conditions transmitted from the portable terminal 110, to store the modified information as bonus information again, to request approval of a corresponding minimum payment amount from the card company, and to transmit the results of the approval to the affiliated shop terminal 120 and, simultaneously, transmit the results of the approval and the modified bonus information to the portable terminal 110.

Furthermore, the portable terminal 110 is configured to change one or more payment conditions of the discount information, membership point information and coupon information of the optimum payment conditions in which the minimum payment amount is obtained, to store the changed optimum payment conditions therein, and to transmit the changed optimum payment conditions to the vendor server 130, thereby allowing payment to be made.

Since the analysis of the optimum payment conditions including a minimum payment amount is performed in the same manner as in the above-described method, a detailed description thereof will be omitted.

More specifically, in the method of analyzing optimum payment conditions using the portable terminal using the above-described configuration, when the customer who has the portable terminal 110 requests payment from the affiliated shop terminal 120, a shop assistant selects an electronic wallet as the payment means of the affiliated shop terminal 120, performs payment processing, and transmits created transaction data to the vendor server 130, thereby requesting approval of the transaction data.

Payment conditions approved by the vendor server 130, in turn, are transmitted to the affiliated shop terminal 120, payment information including a payment amount is generated, and the generated payment information is stored in the form of a QR code or in an RF tag so that the portable terminal 110 can read the payment information.

When the portable terminal 110 requests payment from the vendor server 130 by transmitting the payment information including the payment amount stored in the QR code or RF tag to the vendor server 130, the vendor server 130 transmits the discount information and membership point information of the corresponding affiliated shop where the affiliated shop terminal 120 has been installed to the portable terminal 110, and the portable terminal 110 generates payment conditions using one or more of the discount information and membership point information received from the vendor server 130 and stored coupon information so that a minimum payment amount can be obtained, and then transmits the generated payment conditions to the vendor server 130, thereby allowing payment to be made.

Also in this case, when the portable terminal 110 touches the RF tag or reads the QR code, the portable terminal 110 is automatically connected to the vendor server 130 and thus up-to-date discount information and membership point information stored in the vendor server 130 is made to be transmitted, so that the discount information and membership point information may be used to analyze optimum payment conditions.

As described above, in accordance with the complex payment system and method using a portable terminal according to the present invention, a customer may make payment based on optimum conditions in accordance with each situation, and thus safer transactions can be performed thanks to the reliability of payment.

The invention claimed is:

1. A complex payment system comprising:
an shop terminal, having a first communication unit, configured to generate payment information when a signal for requesting a payment for a transaction is received from a portable terminal via the first communication unit, wherein the payment information for the transaction is generated in binary bits by combining (i) transaction data for the transaction, and (ii) information of a credit card used for the transaction or information of a discount coupon issued to the portable terminal with a unique identification number of the portable terminal; and
the portable terminal, having a second communication unit, configured to execute an electronic wallet application to
  receive, through the second communication unit, the payment information from the shop terminal and
  transmit, through a network, the payment information to the vendor server in order to receive minimum payment means with respect to the transaction in response to the transmitted payment information,
the vendor server, implemented by a processor, configured to
  perform a signal processing of the payment information to generate, in response to the payment information received from the portable terminal, the minimum payment means for the transaction based on the transaction data received from the shop terminal by identifying the portable terminal using the unique identification number,
  comparing the transaction data with discount information and membership point information which are earned by the portable terminal, and
  analyzing a payment condition to obtain minimum payment amount for the transaction by determining an order of payment means selected from at least one of the coupon, card payment, discount or membership applied to the transaction, and
  transmit, through the network, the generated minimum payment means for the transaction to the portable terminal, and
  perform a signal processing for a payment for the transaction when a request for the payment for the transaction is received in response to the generated minimum payment means,
wherein the shop terminal, upon receiving the payment request,
  selects the electronic wallet application as a payment means,
  sends a request for approval of the payment information to the vendor server,
  receives approved payment information, and
  outputs, through the first communication unit, the approved payment information to allow the portable terminal to receive the approved payment information,
wherein the vendor server generates a transaction identity (TID) for the payment information provided from the shop terminal, converts the payment information including the TID into a quick response (QR) code, and transmits the QR code to the shop terminal,
wherein the shop terminal output the QR code received from the vendor server, and
wherein
the portable terminal reads, from the shop terminal through the second communication unit, the QR code to receive the TID, and transmits, to the vendor server through the network, the TID with the unique identification number of the portable terminal, and
the vendor server analyzes the payment condition based on the transmitted TID and the unique identification number of the portable terminal, and transmits, to the portable terminal, the analyzed payment condition including the minimum payment amount in order to be approved by the portable terminal.

2. The complex payment system of claim 1, wherein the portable terminal
receives the analyzed payment condition including the minimum payment amount from the vendor server and
changes the analyzed payment condition by changing the discount information, the membership point information, and the coupon information to allow the payment to be made based on the changed payment condition.

3. The complex payment system of claim 2, wherein the vendor server modifies at least one of the discount information, the membership point information, and the coupon information based on the changed payment condition, stores the modified information as the bonus information, sends a request for approval of a payment amount corresponding to the modified information to a payment server, and transmits a result of the approval to the shop terminal while transmitting the result of the approval and the modified information to the portable terminal.

4. The complex payment system of claim 1, wherein the portable terminal, when the electronic wallet application is executed, displays one or more of a payment window for making the payment, a search window for searching for information about a possessed card or a coupon, and a coupon window for collecting coupon information.

5. The complex payment system of claim 4, wherein, when the search window is activated, a banner image adapted to enable information about an issued or stored card and/or a coupon to be viewed is distinctively displayed, and when the banner image is activated, the portable terminal is operated to access the vendor server to receive and display information about the possessed card or the coupon or to display information stored in the portable terminal.

6. The complex payment system of claim 4, wherein the coupon collection box is operated to read information of a corresponding coupon using a QR code or near field communication (NFC) and to store the read information.

7. A complex payment method, implemented by complex payment system including a processor to execute the method comprising:
transmitting, by a portable terminal through a first communication unit, a payment request to a shop terminal;
selecting, by the shop terminal, an electronic wallet as a payment means;
generating, by the shop terminal, payment information including a payment amount when the payment request is received, wherein the payment information for a transaction is generated in binary bits by combining (i) transaction data for the transaction, and (ii) information of a credit card used for the transaction or information of a discount coupon issued to the portable terminal with a unique identification number of the portable terminal;
transmitting, by the shop terminal over a network, the payment information for transaction data to a vendor server;
receiving, by the vendor server through a network, the payment information from a portable terminal;
by the vendor server, generating a transaction identity (TID) for the payment information provided from the shop terminal, converting the payment information including the TID into a quick response (QR) code, and transmitting the QR code to the shop terminal;
outputting, by the shop terminal, the QR code received from the vendor server;
reading, by the portable terminal, the outputted QR code to receive the TID, and transmitting, to the vendor server, the TID with the unique identification number of the portable terminal;
performing a signal processing of the payment information to generate, in response to the payment information, minimum payment means for the transaction based on the transaction data received from the shop terminal by
identifying the portable terminal using the unique identification number,
comparing the transaction data with discount information and membership point information which are earned by the portable terminal, and
analyzing a payment condition to obtain a minimum payment amount for the transaction by determining an order of payment means selected from at least one of the coupon, card payment, discount or membership applied to the transaction;
transmitting, by the vendor server through the network, the analyzed payment condition including the minimum payment amount for the transaction to the portable terminal; and
making, by the vendor server, payment to the transaction based on the generated minimum payment means and the analyzed payment condition,
wherein the portable terminal, through the first communication unit, executes an electronic wallet application and transmit, over the network, the payment information to the vendor server, and
wherein the vendor server stores, as bonus information, at least one of card information or coupon information in connection with the terminal identification number of the portable terminal and at least one of discount information or membership point information in connection with an shop code, wherein the analyzed payment condition includes at least one of the card information, the coupon information, the discount information, or the membership point information.

8. The complex payment method of claim 7, wherein the analyzed payment condition is generated based on one or more of the card information, the discount information, the membership point information, and the coupon information to obtain a minimum payment amount.

9. The complex payment method of claim 8,
wherein the payment condition analyzed by the vendor server is transmitted, over the network, to the portable terminal and displayed on the portable terminal, wherein the transmitted payment condition is approved or changed by the portable terminal,
wherein the approved or changed payment condition is transmitted to the vendor server, and wherein the vendor server makes the payment based on the approved or changed payment condition.

10. The complex payment method of claim 9, wherein the analyzed payment condition is changed by changing one or more of the card information, the discount information, the membership point information, and the coupon information.

11. The complex payment method of claim 10, further comprising:
modifying, by the vendor server, at least one of the discount information, the membership point information, and the coupon information used for the payment;
storing, by the vendor server, the modified information;
sending, by the vendor server through the network, a request for approval of the minimum payment amount of the payment information to a card company;
transmitting, by the vendor server through the network, a result of the approval to the shop terminal; and
transmitting, by the vendor server through the network, the result of the approval and the modified information to the portable terminal.

12. The complex payment method of claim 7, wherein the portable terminal is operated to, when the electronic wallet application is executed, display one or more of a card issuance box adapted to be used to request issuance of a new card, a search box adapted to search for information about a possessed card or a coupon, and a coupon collection box adapted to collect coupon information.

13. The complex payment method of claim 12, wherein, when the search box is activated, an image adapted to enable information about an issued or stored card or a coupon to be viewed is distinctively displayed, and when the predetermined image is activated, the portable terminal is operated to access the vendor server and to receive and display the information about a possessed card or a coupon.

14. The complex payment method of claim 13, wherein the coupon collection box is operated to read information of a corresponding coupon based on a QR code or NFC and to store the read information of the corresponding coupon.

15. A complex payment system, comprising:
a shop terminal, having a first communication unit;
a portable terminal, having a second communication unit; and
a vendor server, implemented by a processor,
wherein
the portable terminal is configured to transmit, through the second communication unit, a payment request for a transaction to the shop terminal,
the shop terminal is configured to, in response to the payment request received from the portable terminal via the first communication unit,
select an electronic wallet application as a payment means, and
send a request for approval of transaction data by transmitting the transaction data to the vendor server, the transaction data including a shop code associated with the shop terminal and a transaction amount corresponding to the transaction,
the vendor server is configured to, in response to the request for approval of the transaction data received from the portable terminal,
generate a transaction identity (TID) for the transaction data provided from the shop terminal,
convert the transaction data and the TID into a quick response (QR) code, and
transmit the QR code to the shop terminal,
the shop terminal is configured to, in response to the QR code received from the vendor server, output the QR code,
the portable terminal is configured to execute the electronic wallet application to
receive, through the second communication unit, the QR code output by the shop terminal, to obtain the TID, and
transmit, to the vendor server through a network, the obtained TID with a unique identification number of the portable terminal,
the vendor server is configured to, in response to the TID and the unique identification number received from the portable terminal,
identify the portable terminal using the unique identification number received from the portable terminal,
compare the transaction data corresponding to the TID received from the portable terminal with discount information and membership point information which are earned by the portable terminal identified by the unique identification number,
analyze a payment condition to obtain a minimum payment amount for the transaction by determining an order of payment means selected from at least one of a discount coupon, a card for payment, a discount or membership applied to the transaction, and
transmit, through the network, the analyzed payment condition including the minimum payment amount for the transaction to the portable terminal,
the portable terminal executing the electronic wallet application is configured to, in response to the analyzed payment condition including the minimum payment amount received from the vendor server, transmit a requested payment condition to the vendor server through the network, and
the vendor server is configured to, in response to the requested payment condition received from the portable terminal, process payment for the transaction in accordance with the requested payment condition requested by the portable terminal.

16. The complex payment system of claim 15, wherein the portable terminal executing the electronic wallet application is configured to, in response to the analyzed payment condition including the minimum payment amount received from the vendor server,
change the analyzed payment condition by changing at least one of the discount information, the membership point information, or coupon information to obtain a changed payment condition, and
transmit the changed payment condition, as the requested payment condition, to the vendor server.

17. The complex payment system of claim 16, wherein the vendor server is configured to, in response to the changed payment condition requested by the portable terminal,
modify at least one of the discount information, the membership point information, and the coupon information based on the changed payment condition,
store the modified information as bonus information,
send a request for approval of a payment amount corresponding to the modified information to a payment server, and
transmit a result of the approval to the shop terminal, and
transmit the result of the approval and the modified information to the portable terminal.

18. The complex payment system of claim 15, wherein the portable terminal executing the electronic wallet application is configured to display one or more of
a payment window for making payment,
a search window for searching for information about a possessed card or a coupon, and
a coupon window for collecting coupon information.

19. The complex payment system of claim 18, wherein the portable terminal executing the electronic wallet application is configured to
in response to activation of the search window, distinctively display a banner image adapted to enable information about an issued or stored card and/or a coupon to be viewed, and
in response to activation of the banner image,
access the vendor server to receive and display information about the possessed card or the coupon, or
display information stored in the portable terminal.

20. The complex payment system of claim 18, wherein the portable terminal executing the electronic wallet application is configured to, in response to activation of the coupon window,
read information of a corresponding coupon using a QR code or near field communication (NFC), and
store the read information.

21. A complex payment method, implemented by a complex payment system,
the complex payment system comprising:
a shop terminal, having a first communication unit,
a portable terminal, having a second communication unit, and
a vendor server, implemented by a processor,
the method comprising:
transmitting, by the portable terminal through the second communication unit, a payment request for a transaction to the shop terminal;
in response to the payment request received from the portable terminal via the first communication unit, and by the shop terminal,
selecting an electronic wallet application as a payment means, and
sending a request for approval of transaction data by transmitting the transaction data to the vendor server, the transaction data including a shop code associated with the shop terminal and a transaction amount corresponding to the transaction;
in response to the request for approval of the transaction data received from the portable terminal, and by the vendor server,
generating a transaction identity (TID) for the transaction data provided from the shop terminal,
converting the transaction data and the TID into a quick response (QR) code, and
transmitting the QR code to the shop terminal;
in response to the QR code received from the vendor server, outputting, by the shop terminal, the QR code;
executing, by the portable terminal, the electronic wallet application to
receive, through the second communication unit, the QR code output by the shop terminal, to obtain the TID, and
transmit, to the vendor server through a network, the obtained TID with a unique identification number of the portable terminal;
in response to the TID and the unique identification number received from the portable terminal, and by the vendor server,
identifying the portable terminal using the unique identification number received from the portable terminal,
comparing the transaction data corresponding to the TID received from the portable terminal with discount information and membership point information which are earned by the portable terminal identified by the unique identification number,
analyzing a payment condition for the transaction by determining an order of payment means selected from at least one of a discount coupon, a card for payment, a discount or membership applied to the transaction, and
transmitting, through the network, the analyzed payment condition for the transaction to the portable terminal;
in response to the analyzed payment condition received from the vendor server, transmitting, by the portable terminal executing the electronic wallet application, a requested payment condition to the vendor server through the network; and
in response to the requested payment condition received from the portable terminal, processing, by the vendor server, payment for the transaction in accordance with the requested payment condition requested by the portable terminal.

22. The complex payment method of claim 21, wherein the analyzed payment condition is generated, by the vendor server, based on one or more of card information, the discount information, the membership point information, and coupon information to obtain a minimum payment amount.

23. The complex payment method of claim 22, further comprising:
in response to the analyzed payment condition received from the vendor server, and by the portable terminal executing the electronic wallet application,
displaying the analyzed payment condition received from the vendor server, and
approving or changing the displayed analyzed payment condition, and
transmitting the approved or changed payment condition, as the requested payment condition, to the vendor server,
wherein the vendor server processes the payment in accordance with the approved or changed payment condition.

24. The complex payment method of claim 23, wherein the analyzed payment condition is changed, by the portable terminal, by changing one or more of the card information, the discount information, the membership point information, and the coupon information.

25. The complex payment method of claim 24, further comprising:
in response to the changed payment condition requested by the portable terminal, and by the vendor server,
modifying at least one of the discount information, the membership point information, and the coupon information based on the changed payment condition,
storing the modified information,
sending, through the network, a request for approval of the minimum payment amount to a card company, transmitting, through the network, a result of the approval to the shop terminal, and transmitting, through the network, the result of the approval and the modified information to the portable terminal.

26. The complex payment method of claim 21, further comprising:

displaying, by the portable terminal executing the electronic wallet application, one or more of a card issuance box to request issuance of a new card, a search box to search for information about a possessed card or a coupon, and a coupon collection box to collect coupon information.

27. The complex payment method of claim 26, further comprising:

by the portable terminal executing the electronic wallet application, in response to activation of the search box, distinctively displaying an image adapted to enable information about an issued or stored card or a coupon to be viewed, and in response to activation of the image, accessing the vendor server to receive and display information about the possessed card or the coupon.

28. The complex payment method of claim 27, further comprising:

in response to activation of the coupon collection box, and by the portable terminal executing the electronic wallet application, reading information of a corresponding coupon based on a QR code or near field communication (NFC), and storing the read information of the corresponding coupon.

* * * * *